United States Patent
Sugiura et al.

(10) Patent No.: US 10,775,711 B2
(45) Date of Patent: Sep. 15, 2020

(54) FERRITE CARRIER CORE MATERIAL FOR ELECTROPHOTOGRAPHIC DEVELOPER, FERRITE CARRIER FOR ELECTROPHOTOGRAPHIC DEVELOPER, ELECTROPHOTOGRAPHIC DEVELOPER, AND METHOD FOR MANUFACTURING FERRITE CARRIER CORE MATERIAL FOR ELECTROPHOTOGRAPHIC DEVELOPER

(71) Applicant: POWDERTECH CO., LTD., Chiba (JP)

(72) Inventors: Takao Sugiura, Chiba (JP); Kazutaka Ishii, Chiba (JP); Koji Aga, Chiba (JP)

(73) Assignee: POWDERTECH CO., LTD., Chiba (JP)

(*) Notice: Subject to any disclaimer, the term of this patent is extended or adjusted under 35 U.S.C. 154(b) by 0 days.

(21) Appl. No.: 16/084,420

(22) PCT Filed: Mar. 29, 2017

(86) PCT No.: PCT/JP2017/013053
§ 371 (c)(1),
(2) Date: Sep. 12, 2018

(87) PCT Pub. No.: WO2017/175647
PCT Pub. Date: Oct. 12, 2017

(65) Prior Publication Data
US 2019/0086829 A1    Mar. 21, 2019

(30) Foreign Application Priority Data
Apr. 5, 2016 (JP) .................. 2016-076044

(51) Int. Cl.
*G03G 9/107* (2006.01)
*G03G 9/113* (2006.01)
(Continued)

(52) U.S. Cl.
CPC ....... *G03G 9/1075* (2013.01); *C01G 49/0036* (2013.01); *C01G 49/0072* (2013.01);
(Continued)

(58) Field of Classification Search
CPC .. G03G 9/1139; G03G 9/1075; G03G 9/1131; G03G 9/113; G03G 9/107
(Continued)

(56) References Cited

U.S. PATENT DOCUMENTS

| 5,595,850 A | 1/1997 | Honjo et al. |
| 6,228,549 B1 | 5/2001 | Lambert et al. |

(Continued)

FOREIGN PATENT DOCUMENTS

| JP | H07-181745 A | * | 7/1995 |
| JP | H08-022150 A | | 1/1996 |

(Continued)

OTHER PUBLICATIONS

Espacenet machine-assisted English-language translation of JP 2002-196541 (pub. Jul. 2002). (Year: 2002).*

(Continued)

*Primary Examiner* — Christopher D Rodee
(74) *Attorney, Agent, or Firm* — Greenblum & Bernstein, P.L.C.

(57) ABSTRACT

An object of the present invention is to provide a ferrite carrier core material for an electrophotographic developer having desired resistance properties and charging properties with small environmental variation of resistivity and charge amount while maintaining the advantages of ferrite carriers, a ferrite carrier for an electrophotographic developer, an electrophotographic developer using the ferrite carrier, and a method for manufacturing the ferrite carrier core material for an electrophotographic developer. In order to solve the problem, a ferrite carrier core material comprising ferrite (Continued)

particles containing 15 mass % or more and 25 mass % or less of Mn, 0.5 mass % or more and 5.0 mass % or less of Mg, 0.05 mass % or more and 4.0 mass % of Sr, and 45 mass % or more and 55 mass % or less of Fe, with Si localized in the surface thereof is used.

12 Claims, 1 Drawing Sheet

(51) Int. Cl.
  *C01G 49/00* (2006.01)
  *G03G 9/08* (2006.01)
(52) U.S. Cl.
  CPC .......... *G03G 9/0819* (2013.01); *G03G 9/107* (2013.01); *G03G 9/1131* (2013.01); *G03G 9/1136* (2013.01); *C01P 2002/52* (2013.01); *C01P 2004/61* (2013.01); *C01P 2004/84* (2013.01); *C01P 2006/42* (2013.01)
(58) Field of Classification Search
  USPC ........................................ 430/111.31, 111.33
  See application file for complete search history.

(56) References Cited

U.S. PATENT DOCUMENTS

| | | | | |
|---|---|---|---|---|
| 8,465,898 | B2 * | 6/2013 | Iwata | G03G 9/107 |
| | | | | 420/70 |
| 10,564,561 | B2 * | 2/2020 | Sugiura | G03G 9/1139 |
| 2004/0185366 | A1 | 9/2004 | Shinmura et al. | |
| 2006/0003248 | A1 | 1/2006 | Kobayashi et al. | |
| 2006/0187546 | A1 * | 8/2006 | Ohido | C30B 19/02 |
| | | | | 359/484.02 |
| 2011/0212399 | A1 | 9/2011 | Suwa et al. | |
| 2013/0011780 | A1 | 1/2013 | Kawauchi et al. | |
| 2016/0070193 | A1 | 3/2016 | Aga | |

FOREIGN PATENT DOCUMENTS

| | | | |
|---|---|---|---|
| JP | 2002-196541 A | * | 7/2002 |
| JP | 2005-314176 A | | 11/2005 |
| JP | 2007-134465 A | | 5/2007 |
| JP | 2010-197899 A | | 9/2010 |
| JP | 2010-243783 A | | 10/2010 |
| JP | 2011-180296 A | | 9/2011 |
| JP | 2012-025640 A | | 2/2012 |
| JP | 2013-050733 A | | 3/2013 |
| JP | 2013-171265 A | | 9/2013 |
| JP | 2014-137425 A | | 7/2014 |
| JP | 2014-182304 A | | 9/2014 |
| JP | 2015-138052 A | | 7/2015 |

OTHER PUBLICATIONS

Espacenet machine-assisted English-language translation of JP H07-181745 (pub. Jul. 1995). (Year: 1995).*
Japanese Industrial Standard (JIS) Z 8802, partial document (5 pages) in English (Year: 2011).*
U.S. Appl. No. 16/084,466 to Takao Sugiura et al., which was filed on Sep. 12, 2018.
U.S. Appl. No. 16/082,102 to Takashi Kojima et al., which was filed on Sep. 4, 2018.
International Search Report for International Application No. PCT/JP2017/013053, dated Jun. 20, 2017.
Office Action issued in JP Patent Application No. 2018-510559 dated May 19, 2020, English translation.

* cited by examiner

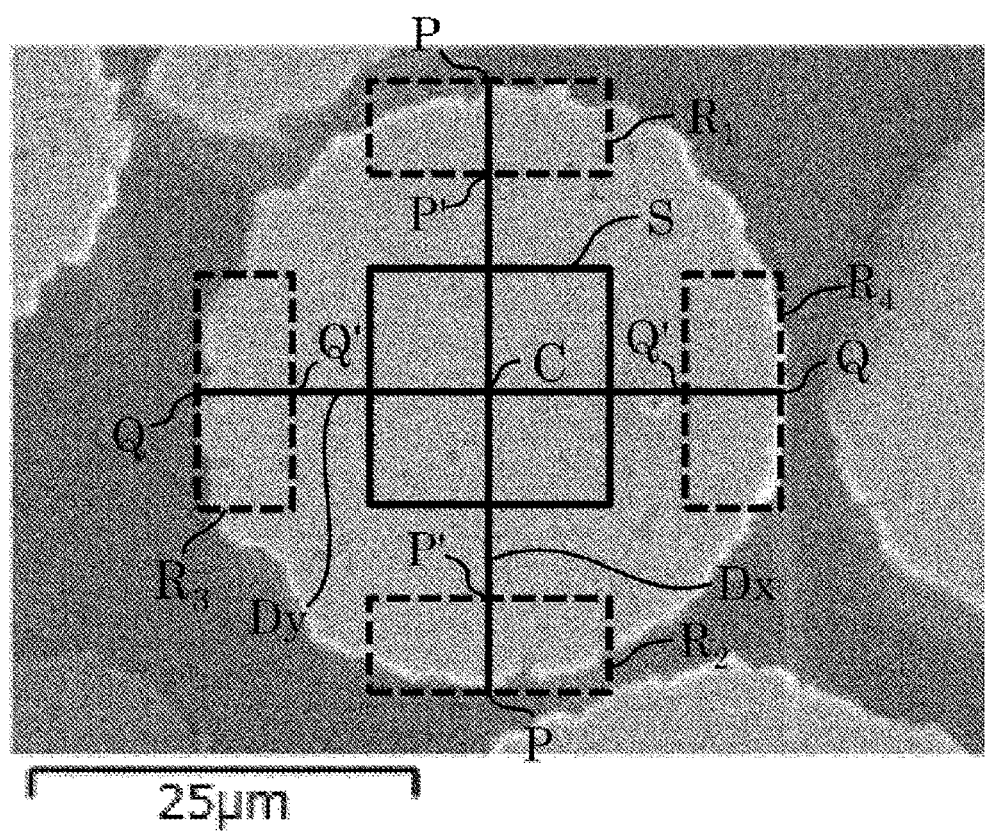

FERRITE CARRIER CORE MATERIAL FOR ELECTROPHOTOGRAPHIC DEVELOPER, FERRITE CARRIER FOR ELECTROPHOTOGRAPHIC DEVELOPER, ELECTROPHOTOGRAPHIC DEVELOPER, AND METHOD FOR MANUFACTURING FERRITE CARRIER CORE MATERIAL FOR ELECTROPHOTOGRAPHIC DEVELOPER

TECHNICAL FIELD

The present invention relates to a ferrite carrier core material for an electrophotographic developer with a two-component system for use in a copier, a printer and the like and a ferrite carrier using the ferrite carrier core material, and more specifically to a ferrite carrier core material for an electrophotographic developer having desired resistance properties and charging properties, and having small fluctuation of the resistivity and the charge caused by environmental changes, an electrophotographic developer, and a method for manufacturing the ferrite carrier core material for an electrophotographic developer.

BACKGROUND ART

The electrophotographic developing method is a method including adhering toner in a developer on an electrostatic latent image formed on a photo conductor. As the electrophotographic developing method, a magnetic brush method using a magnet roll is widely employed in the present days. The developers for use in the method can be divided into two groups: a two-component developer composed of toner and carrier, and a one-component developer using toner only.

In a two-component developer, the carrier is mixed and stirred with the toner and has functions for triboelectrically charging and carrying the toner. In comparison with a one-component developer, a two-component developer has a better controllability in designing a developer. A two-component developer is therefore widely used in a full-color developing device that requires high image quality and a high-speed printer that requires reliability and durability in maintaining an image.

It is required for the two-component developer for such use to have image properties such as image density, fogging, white spots, tone reproduction and resolution at a predetermined level in the early stage. In addition, these properties are required to be stably maintained without fluctuation in an endurance printing period. It is therefore required for the developer to achieve high reliability as well as high definition and high definition image quality.

In recent years, from the viewpoints of high definition image quality and energy saving, toners such as polymerized toner and low-temperature fixing toner have been used. These newly developed toners have a problem of large environmental variation of electrical properties such as the resistivity and the charge amount when used in a developer. Accordingly, a developer having small environmental variation of electrical properties is required.

In Patent Literature 1 (Japanese Patent Laid-Open No. 08-22150), a ferrite carrier for an electrophotographic developer including a ferrite composed of MnO, MgO and $Fe_2O_3$, partly substituted with SrO, is described. It is said that according to the description in the Literature, by reducing deviation in magnetization among ferrite carrier particles, a ferrite carrier for electrophotographic developer that is excellent in image quality and durability and environmentally friendly, having a long life and high environmental stability, can be obtained.

In Patent Literature 2 (Japanese Patent Laid-Open No. 2013-50733), described is a ferrite carrier of electrophotographic developer having a core composition represented by a general formula $Mn_xFe_{3-x}O_{4+y}$ ($0<x\leq1$, $0<y$) as main component, containing 0.1 wt % or more of Si and 0.03 wt % or more of Mg. It is said that from the ferrite described in the Literature, a carrier core material of electrophotographic developer which achieves high charging performance by itself and low environmental dependence can be obtained.

The inventions described in Patent Literatures 1 and 2, however, have difficulty to meet recent strict requirement for minimizing environmental variation of electrical properties such as resistivity and charge amount. Particularly in Patent Literature 2, although the improvement of the environment-induced fluctuation in resistivity is described in Examples, no specific suggestion is given on the improvement of the environment-induced fluctuation in charge amount.

In order to suppress environmental variation of the electrical properties, the surface state of a ferrite particle needs to be improved. Accordingly, in Patent Literature 3 (Japanese Patent Laid-Open No. 2012-25640), a ferrite particle represented by $(M_xFe_{3-x})O_4$ (M: at least one metal selected from the group consisting of Fe, Mg, Mn, Ca, Ti, Cu, Zn, Sr and Ni; $0\leq x\leq1$) with the surface of ferrite particle body coated with alumina, and a carrier for electrophotographic developing including the ferrite particle having a surface coated with a resin are described.

According to the description in Patent Literature 3, it is said that a ferrite particle having a small apparent density and excellent fluidity can be obtained by coating the surface with alumina. In Patent Literature 3, however, no suggestion for improving environmental variation of electrical properties such as resistivity and charge amount is provided.

Also, in Patent Literature 4 (Japanese Patent Laid-Open No. 2014-137425), a ferrite particle including a complex oxide containing Fe and Mg in a solid solution state in the vicinity of particle surface, having different Fe and Mg contents between the internal part of a particle and the vicinity of particle surface, and a carrier for electrophotographic developing including the ferrite particle having a surface coated with a resin are described. Furthermore, in Patent Literature 5 (Japanese Patent Laid-Open No. 2014-182304), a ferrite carrier core material including practically Mg ferrite particle with a surface coated with a Ti compound, and a ferrite carrier including the ferrite carrier core material coated with a resin are described.

According to the inventions described in Patent Literatures 4 and 5, it is said that an Mg ferrite allows the resistivity and the magnetization to be controlled to any value without a surface oxidation treatment, from which a carrier excellent in charging properties can be obtained. Although these inventions achieve high charging capability, it does not mean that environmental variation of charge amount can be suppressed. Also, in Patent Literatures 4 and 5, no suggestion for improving environmental variation of resistivity is provided.

Furthermore, in Patent Literature 6 (Japanese Patent Laid-Open No. 2015-138052), a ferrite particle of practically Mg ferrite with a surface coated with a Ti compound, having an internal porous structure and an outer shell structure around the outer periphery thereof, and a carrier for electrophotographic developing including the ferrite particle impregnated or coated with a resin are described. It is said that the ferrite carrier according to the invention described in Patent Literature 6 has a low apparent density, which results in small stirring stress applied to toner and excellent charging stability in use of long duration. However, also in Patent Literature 6, no suggestion for improving environmental variation of electrical properties such as resistivity and charge amount is provided. In other words, the problem has not been solved by the invention.

CITATION LIST

Patent Literature

Patent Literature 1: Japanese Patent Laid-Open 08-22150
Patent Literature 2: Japanese Patent Laid-Open 2013-50733
Patent Literature 3: Japanese Patent Laid-Open No. 2012-25640
Patent Literature 4: Japanese Patent Laid-Open 2014-137425
Patent Literature 5: Japanese Patent Laid-Open No. 2014-182304
Patent Literature 6: Japanese Patent Laid-Open No. 2015-138052

SUMMARY OF INVENTION

Technical Problem

An object of the present invention, therefore, is to provide a ferrite carrier core material for an electrophotographic developer having desired resistance properties and charging properties with small environmental variation of resistivity and charge amount while maintaining the advantages of a ferrite carrier, a ferrite carrier for an electrophotographic developer, an electrophotographic developer using the ferrite carrier, and a method for manufacturing a ferrite carrier core material for an electrophotographic developer.

Solution to Problem

Through extensive investigation to solve the problem described above, the present inventors found that the object can be achieved by Si localized in the surface of a ferrite particle having a specific composition. The present invention was made based on the founding.

In other words, the present invention provides a ferrite carrier core material for an electrophotographic developer, comprising a ferrite particle containing 15 mass % or more and 25 mass % or less of Mn, 0.5 mass % or more and 5.0 mass % or less of Mg, 0.05 mass % or more and 4.0 mass % or less of Sr, and 45 mass % or more and 55 mass % or less of Fe, with Si localized in the surface thereof.

Preferably, the ferrite carrier core material of the present invention contains 0.1 mass % or more and 3.0 mass % or less of Si.

Preferably, the ferrite carrier core material of the present invention has a degree of localization of Si represented by the following Expression (1) of 1.1 or more and 20.0 or less:

$$\text{Degree of localization of Si} = \text{Si}(s)/\text{Si}(c) \quad (1)$$

Note that Si(s) represents a Si content (mass %) in the surface part of the cross section of a particle examined by energy dispersive X-ray analysis, and Si(c) represents a Si content (mass %) in the central part of the cross section of a particle examined by energy dispersive X-ray analysis.

In the ferrite carrier core material of the present invention, the surface of the ferrite particle is coated with $SiO_2$, preferably at a $SiO_2$ coating amount of 0.2 mass % or more and 5.0 mass % or less relative to 100 parts by mass of the ferrite particle.

In an elution testing of the ferrite carrier core material of the present invention, preferably the Cl concentration is 0.1 ppm or more and 50 ppm or less.

In an elution testing of the ferrite carrier core material of the present invention, preferably the Sr concentration is 50 ppm or more and 1300 ppm or less.

Preferably, the ferrite carrier core material of the present invention has a volume average particle diameter of 15 µm or more and 60 µm or less.

Preferably, the ferrite carrier core material of the present invention has a saturation magnetization of 30 $Am^2/kg$ or more and 80 $Am^2/kg$ or less.

Preferably, the ferrite carrier core material of the present invention is obtained by coating the surface of a ferrite particle precursor containing 15 mass % or more and 25 mass % or less of Mn, 0.5 mass % or more and 5.0 mass % or less of Mg, 0.05 mass % or more and 4.0 mass % or less of Sr, and 45 mass % or more and 55 mass % or less of Fe with $SiO_2$, and by sintering the ferrite particle precursor with the surface coated with $SiO_2$.

The present invention provides a ferrite carrier for an electrophotographic developer including the ferrite carrier core material and a resin coating layer provided on the surface of the ferrite carrier core material.

The present invention provides an electrophotographic developer composed of the ferrite carrier for an electrophotographic developer and a toner.

The electrophotographic developer of the present invention can be used also as a refill developer.

The present invention provides a method for manufacturing the ferrite carrier core material for an electrophotographic developer including the steps of obtaining a ferrite particle precursor containing 15 mass % or more and 25 mass % or less of Mn, 0.5 mass % or more and 5.0 mass % or less of Mg, 0.05 mass % or more and 4.0 mass % or less of Sr, and 45 mass % or more and 55 mass % or less of Fe, coating the surface of the ferrite particle precursor with $SiO_2$, and sintering the ferrite particle precursor with the surface coated with $SiO_2$.

In the method for manufacturing the ferrite carrier core material for an electrophotographic developer of the present invention, preferably the surface of the ferrite particle precursor is coated with 0.2 mass % or more and 5.0 mass % or less of $SiO_2$ relative to 100 mass % of the ferrite particle precursor.

Advantageous Effect of Invention

The ferrite carrier core material for an electrophotographic developer of the present invention can obtain desired resistance properties and charging properties with small environmental variation of resistivity and charge amount. As a result, an electrophotographic developer including a ferrite carrier obtained from the ferrite carrier core material coated with a resin and a toner has excellent resistivity stability and charging stability under various environments.

BRIEF DESCRIPTION OF DRAWINGS

FIGURE is an SEM photograph, showing the cross section of a particle of the ferrite carrier core material in an embodiment of the present invention.

DESCRIPTION OF EMBODIMENT

The embodiment carrying out the present invention is described in the following.

1. Ferrite Carrier Core Material for Electrophotographic Developer of the Present Invention The ferrite carrier core material for an electrophotographic developer of the present invention (hereinafter, referred to as "ferrite carrier core material") includes a ferrite particle having a specific composition with Si localized in the surface thereof. It was found that Si localized in the surface of a ferrite particle (including the vicinity of the surface; the same shall apply hereinafter.) can suppress fluctuation of electrical properties such as resistivity and charge amount of a ferrite carrier core material by environmental changes. Although the detailed mechanism thereof is unknown, it is assumed that the surrounding environmental variation of electrical properties of a ferrite carrier core material are caused by adhesion of water molecules in the air to the surface of a ferrite particle. It is assumed that Si localized in the surface of a ferrite particle prevents water molecules from being adsorbed on the surface of the ferrite particle, so that the surrounding environmental variation of electrical properties can be minimized.

1-1. Si

In the present invention, Si is localized in the surface of a ferrite particle as described above. The localization of Si in the surface of the ferrite particle means that the distribution of Si in the ferrite particle is different between the surface and the internal part, and Si is mainly present in the surface of the ferrite particle. The Si stated herein means a Si element. In FIGURE, an SEM photograph of the cross section of a particle of the ferrite carrier core material observed by a scanning electron microscope (SEM) is shown.

Preferably, the ferrite carrier core material of the present invention contains 0.1 mass % or more and 3.0 mass % or less of Si. The Si content in the whole of a ferrite carrier core material is examined by silicon dioxide gravimetry in accordance with JIS (Japanese Industrial Standard) G 1212.

For example, as described in Patent Literature 2, a ferrite particle including Si uniformly dispersed within a particle is obtained in the case where Si ($SiO_2$) is added in the step of mixing raw materials. In such a ferrite particle, the Si content in the surface of the ferrite particle is less considering the amount of Si added in the step of mixing raw materials. Due to the resulting amount of Si in the surface of the ferrite particle is less, the above effect cannot be efficiently exerted. Meanwhile, in order to increase the amount of Si in the surface of the ferrite particle to an extent capable of exerting the effect, a large amount of Si ($SiO_2$) is required to be added in the step of mixing raw materials. However, since $SiO_2$ is a non-magnetic material, the saturation magnetization of a ferrite particle is severely reduced. Accordingly, the localization of Si in the surface of the ferrite particle is preferred from the viewpoint of producing the above effect without reduction in the saturation magnetization of a ferrite particle.

Preferably, the ferrite carrier core material of the present invention has a degree of localization of Si represented by the following Expression (1) of 1.1 or more and 20.0 or less:

$$\text{Degree of localization of Si} = Si(s)/Si(c) \tag{1}$$

Note that Si(s) represents a Si content (mass %) in the surface part of the cross section of a particle examined by energy dispersive X-ray analysis, and Si(c) represents a Si content (mass %) in the central part of the cross section of a particle examined by energy dispersive X-ray analysis.

Note that the central part of the cross section of a particle can be defined as follows. As shown in FIGURE, when the maximum diameter of the cross section of a ferrite carrier core material is defined as a line segment Dx, let the midpoint of the line segment Dx be the center C of the cross section of the particle, and the end points of the line segment Dx be points P, respectively. And let the square having the center C at the central position and a side length of 35% of the length of the line segment Dx be a square S. In the present invention, the region surrounded by the square S is defined as the central part in the cross section of a particle of the ferrite carrier core material.

Subsequently, the surface part of the cross section of a particle can be defined as follows. Let the point on the line segment Dx at a distance of 15% of the length of the line segment Dx toward the center C from the point P be a point P'. And let the rectangle having a line segment with a length of 35% of the length of the line segment Dx, extending perpendicularly to the line segment Dx, with a midpoint P or P', as the long side, and a line segment with a length of 15% of the length of the line segment Dx as the short side, be a rectangle $R_1$. In the present invention, the region surrounded by the rectangle $R_1$ is defined as the surface part in the cross section of a particle of the ferrite carrier core material.

The central part and the surface part of the cross section of a particle defined as described above are subjected to energy dispersive X-ray analysis (EDX analysis) as described below. In the EDX analysis, the content of an element in a specific region of a ferrite carrier core material can be examined.

(a) A ferrite carrier core material embedded in a resin undergoes cross section processing by ion milling to make a cross-sectional sample for the examination. Ion milling is performed with an accelerating voltage of 6.0 kV under an argon atmosphere, by using IM4000PLUS manufactured by Hitachi High-Technologies Corporation. Note that the ferrite carrier core material particle as analysis target is a particle having a maximum diameter Dx in the range of $D_{50} \times 0.85 \leq Dx \leq D_{50} \times 1.2$, wherein $D_{50}$ represents the volume average particle diameter of the ferrite carrier core material.

(b) Using the cross-sectional sample obtained, the cross section of a particle of the ferrite carrier core material is observed by a scanning electron microscope (SEM, SU8020 manufactured by Hitachi High-Technologies Corporation) with an accelerating voltage of 15 kV and a WD of 15 mm. On this occasion, the magnification is determined such that only one particle of the ferrite carrier core material is present in the visual field, and the whole of the particle falls within the visual field.

(c) The central part and the surface part of the cross section of a particle of the ferrite carrier core material, i.e., the regions surrounded by the square S and the rectangle $R_1$, respectively, are subjected to EDX analysis. In the EDX analysis, mapping collection of Fe, Mn, Mg, Sr and Si is performed using an energy dispersive X-ray analyzer (EMax X-Max50, manufactured by Horiba, Ltd.), and each element content (mass %) is calculated from the peak of X-ray spectrum obtained. The obtained Si content in the central part of the cross section of a particle is represented by "Si(c)" and the Si content in the surface part of the cross section of a particle is represented by "Si(s)".

The Si content in the central part of the cross section of a particle (Si(c)) and the Si content in the surface part of the cross section of a particle (Si(s)) obtained in the EDX analysis are substituted into the Expression (1) described above, so that the degree of localization of Si in a particle of the ferrite carrier core material can be obtained.

On this occasion, more preferably, the Si content in the surface part of the cross section of a particle is an average of the Si content in the regions each defined as surface parts, surrounded by rectangles $R_2$, $R_3$, $R_4$, . . . , each, which are defined in the same manner as rectangle $R_1$. In the present embodiment, rectangles $R_2$, $R_3$ and $R_4$ are defined as follows, and the average of Si content in the regions surrounded by the rectangles $R_1$, $R_2$, $R_3$ and $R_4$ each in the cross section of a particle of the ferrite carrier core material is assumed to be the Si content in the surface part of the cross section of a particle (Si(s)).

The rectangle $R_2$ is defined in exactly the same manner as the rectangle $R_1$, by using an end point P as reference that is different from the end point P on the line segment Dx for use in defining the rectangle $R_1$. The rectangle $R_3$ and the rectangle $R_4$ are defined as described below. Let the line segment passing through the center C, extending perpendicularly to the line segment Dx, with end points at the contour of the cross section of a particle of the ferrite carrier core material, be a line segment Dy. Let the end points be points Q, respectively. Let the point on the line segment Dy at a distance of 15% of the length of the line segment Dx toward the center C from the point Q be a point Q'. And the rectangles having a line segment with a length of 35% of the length of the line segment Dx, extending perpendicularly to the Dy, with a midpoint Q or Q', as the long side, and a line segment with a length of 15% of the length of the line segment Dx as the short side, are defined as rectangles $R_3$ and $R_4$, respectively. The regions surrounded by the rectangles $R_2$, $R_3$ and $R_4$ are defined as the surface parts in the cross section of a particle of the ferrite carrier core material, respectively. The Si content of each of the surface parts is determined from EDX analysis. The average of the Si content in the rectangles $R_1$ to $R_4$ is assumed to be the Si content in the surface part of the cross section of a particle (Si(s)).

Although the average of the Si content in the regions surrounded by four rectangles $R_1$ to $R_4$ is employed as the Si content in the surface part of the cross section of a particle (Si(s)) in the present embodiment, the number of rectangles may be any, not being limited to four. Preferably, the rectangles $R_1$, $R_2$, $R_3$, $R_4$, . . . are arranged at approximately equal intervals along the contour of the cross section of a particle.

As described above, the degree of localization of Si in one particle of the ferrite carrier core material can be calculated. The degree of localization of Si in 100 particles of the ferrite carrier core material can be calculated in the same manner, and the average thereof is assumed to be the degree of localization of Si of the ferrite carrier core material.

With a Si content of less than 0.1 mass % in a ferrite carrier core material, it is difficult to suppress environmental variation of electrical properties of the ferrite carrier core material due to the extremely small amount of Si present in the surface of a ferrite particle, which is undesirable. With a degree of localization of Si in a ferrite carrier core material of less than 1.1, Si present in the surface of the ferrite carrier core material is extremely few, the number of Si is larger in the internal part than in the surface, or Si is present dispersed in the whole of a particle. In other words, it cannot be said that Si is localized practically in the surface of a ferrite particle, and it is difficult to suppress environmental variation of electrical properties of the ferrite carrier core material, which is undesirable. Also, with a Si content in a ferrite carrier core material of more than 3.0 mass %, or with a degree of localization of Si of larger than 20.0, non-magnetic phases originated from Si increase in the ferrite particle, so that the saturation magnetization of the ferrite carrier core material severely decreases. As a result, predetermined magnetic properties required for a ferrite carrier for an electrophotographic developer is not able to be obtained. Furthermore, as the Si content in the surface of a ferrite particle increases, the resistivity of the ferrite carrier core material rises. As a result, when mixed with a toner, the ferrite carrier core material requires a longer time for the charge amount to reach a saturation value, easily causing toner scattering immediately after refilling of the toner, which is undesirable.

Preferably, the ferrite carrier core material of the present invention includes Si element present as $SiO_2$ localized in the surface, and the surface thereof is coated with $SiO_2$. The $SiO_2$ coating amount is preferably 0.2 mass % or more and 5.0 mass % or less, more preferably 0.4 mass % or more and 4.0 mass % or less, most preferably 0.5 mass % or more and 2.0 mass % or less, relative to 100 parts by mass of the ferrite particles. With a $SiO_2$ coating amount in the range, the effect for minimizing environmental variation of electrical properties can be more enhanced.

With the $SiO_2$ coating amount of less than 0.2 mass %, it is difficult to suppress the environmental variation of electrical properties, which is undesirable. With the $SiO_2$ coating amount of more than 5.0 mass %, non-magnetic phases originated from Si increase in the surface of a ferrite particle, so that the saturation magnetization of the ferrite carrier core material decreases severely. As a result, predetermined magnetic properties required for a ferrite carrier for an electrophotographic developer cannot be obtained. Furthermore, as the Si content in the surface of a ferrite particle increases, the resistivity of the ferrite particle rises. As a result, when mixed with a toner, the ferrite carrier core material requires a longer time for the charge amount to reach a saturated value, easily causing toner scattering immediately after refilling of the toner, which is undesirable.

1-2. Composition of Ferrite Particle (1) Mn, Mg, Sr and Fe

In the present invention, a ferrite particle contains 15 mass % or more and 25 mass % or less of Mn, 0.5 mass % or more and 5.0 mass % of less of Mg, 0.05 mass % or more and 4.0 mass % or less of Sr, and 45 mass % or more and 55 mass % or less of Fe. Localization of Si in the surface of the ferrite particle having the specific composition allows the effect to be exerted.

Note that with a composition having an Mn content of less than 15 mass % and an Mg content of more than 5 mass %, the magnetization of a ferrite particle is not able to be enhanced, which causes undesirable carrier scattering. Meanwhile, with a composition having an Mn content of more than 25 mass % and an Mg content of less than 0.5 mass %, although the magnetization can be enhanced, the content of MgO having a high electronegativity in a ferrite particle decreases relatively. As a result, the charge amount of the ferrite particle decreases, which is undesirable.

Also, containing Sr has not only an effect on maintaining the high magnetization of a ferrite particle, but also enhancing the charging capacity of a ferrite particle, contributing the control of electrical properties of the surface of the ferrite particle. With a Sr content of less than 0.05 mass %, it is difficult to obtain these effects. With a Sr content of more than 4 mass %, the ferrite particle has a high residual magnetization and a high coercive force, so that image defects such as brush streaks occur in use as a developer, resulting in undesirable lowered image quality.

The content of Fe, Mn, Mg and Sr each are examined, for example, by the following method. Weighed 0.2 g of a ferrite carrier core material is completely dissolved in a 60 ml of pure water with addition of 20 ml of 1N hydrochloric acid and 20 ml of 1N nitric acid by heating to prepare an aqueous solution. The content of Fe, Mn, Mg and Sr in the solution as a sample can be examined by an ICP analyzer (ICPS-1000IV manufactured by Shimadzu Corporation) or the like.

(2) Chloride

In the present invention, preferably the Cl concentration in an elution testing of a ferrite carrier core material (hereinafter referred to as "eluted Cl concentration) is 0.1 ppm or more and 50 ppm or less. The eluted Cl concentration represents the amount of chlorides in the surface of a ferrite carrier core material. In manufacturing of a ferrite carrier core material, a Cl-containing metal oxide may be used as raw material. As a result, chlorides are generally present in the surface of a ferrite carrier core material. With an increased amount of chlorides in the surface, moisture (water molecules) in the used atmosphere is easily adsorbed, so that environmental variation of electrical properties of the ferrite carrier core material increase. In other words, in order to suppress environmental variation of electrical properties of a ferrite carrier core material, it is important to control the amount of chlorides present in the surface of the ferrite carrier core material, not in the internal part of the ferrite carrier core material. By controlling the Cl concentration in the range in the elution testing of a ferrite carrier core material, environmental variation of electrical properties of the ferrite carrier core material can be, therefore, more satisfactorily suppressed.

As the method for examining the concentration of Cl present in the surface of a ferrite carrier core material, an elution testing of the ferrite carrier core material as sample can be performed as follows.

(a) Accurately weighed 50.000 g±0.0002 g of a sample is placed in a 150 ml glass bottle.

(b) Into the glass bottle, 50 ml of a phthalate (pH: 4.01) is added.

(c) Into the glass bottle, 1 ml of an ionic strength conditioner is consecutively added, and the lid is closed.

(d) The mixture is stirred with a paint shaker for 10 minutes.

(e) A magnet is applied to the bottom of the 150-ml glass bottle, and the mixture is filtered into a vessel made of PP (50 ml) through filter paper No. 5B, with attention not to drop the sample.

(f) The voltage of the supernatant obtained is examined by a pH meter.

(g) Solutions having different Cl concentrations prepared for a calibration curve (pure water, 1 ppm, 10 ppm, 100 ppm and 1000 ppm) were examined to calculate the Cl concentration of a sample from the examined values.

An eluted Cl concentration examined by the method of more than 50 ppm indicates that a large amount of chlorides are present in the surface of a ferrite carrier core material. As a result, moisture (water molecules) in the used atmosphere is easily adsorbed, so that environmental variation of electrical properties of the ferrite carrier core material increase as described above, which is undesirable.

Note that it is difficult to achieve an eluted Cl concentration of less than 0.1 ppm on an industrially scale. Iron oxides generally used as a raw material for a ferrite carrier core material contain several hundred ppm of Cl. The reason is that iron oxides generated as a byproduct in a step of hydrochloric acid pickling in steel production are industrially used as raw material in manufacturing of a ferrite carrier core material. Such iron oxides are classified into several grades, and even iron oxides with a minimum Cl content contain about 200 ppm of Cl.

In the ferrite carrier core material of the present invention, the Fe content of a ferrite particle is 45 mass % or more and 55 mass % or less. In conversion to iron oxide ($Fe_2O_3$), the ferrite particle contains 50 mass % or more of iron oxide. In this case, even with use of iron oxide containing a minimum amount industrially, about 125 ppm of Cl is present in a ferrite carrier core material. The process for manufacturing a ferrite carrier core material includes the steps of calcining and sintering. In these sintering steps, a ferrite particle precursor is heated at high temperature, so that a part of Cl contained in the ferrite particle precursor is removed. However, not the whole of Cl can be removed. As a result, a predetermined amount of Cl is present in the surface of a ferrite carrier core material. Although the amount of Cl present in a ferrite carrier core material can be reduced by using iron oxide having a higher purity or controlling the sintering conditions, it is difficult to achieve an eluted Cl concentration of 0.1 ppm. Furthermore, use of iron oxide having a high purity results in undesirable increased production cost. Since the sintering conditions are factors for controlling the surface properties of a ferrite carrier core material, it is difficult to adjust the sintering conditions only for controlling the amount of chloride in the surface. Because of these, it is industrially difficult to achieve an eluted Cl concentration of less than 0.1 ppm.

(3) Sr Concentration in Surface

In the present invention, preferably the Sr concentration in the elution testing of a ferrite carrier core material (hereinafter referred to as "eluted Sr concentration) is 50 ppm or more and 1300 ppm or less. The eluted Sr concentration represents the amount of Sr compounds in the surface of a ferrite carrier core material. With Sr compounds, i.e., alkaline earth metal compounds, present in the surface of a ferrite carrier core material, moisture (water molecules) in the used atmosphere is easily adsorbed as in the case of chlorides, so that environmental variation of electrical properties of the ferrite carrier core material increase. By controlling the Sr concentration in the range in the elution testing of a ferrite carrier core material, the amount of Sr compounds in the surface is, therefore, controlled in a specific range, and environmental variation of electrical properties of the ferrite carrier core material can be more satisfactorily suppressed.

As the method for examining the concentration of eluted Sr in the surface of a ferrite carrier core material, an elution testing of the ferrite carrier core material as sample can be performed as follows.

(a) Accurately weighed 50.000 g±0.0002 g or less of a sample is placed in a 100 ml glass bottle.

(b) Into the glass bottle, 50 ml of a pH 4 standard solution for calibration of pH meter is added.

(c) The mixture is stirred with a paint shaker for 10 minutes.

(d) After completion of stirring, 2 ml of the supernatant is sampled and diluted to 100 ml with addition of pure water. The diluted solution is examined by ICP.

(e) The examined value is multiplied by 50 to obtain the amount of eluted Sr.

The pH 4 standard solution for use is specified in JIS (Japanese Industrial Standard) Z 8802 concerning methods for examination of pH.

An eluted Sr concentration of less than 50 ppm indicates that the ferrite carrier core material contains no Sr. In other words, the ferrite particle having the composition described above is not able to be obtained. Meanwhile, with an eluted Sr concentration of more than 1300 ppm, environmental variation of resistivity and charge amount of the ferrite carrier core material increase, which is undesirable.

1-3. Volume Average Particle Diameter

The volume average particle diameter of the ferrite carrier core material of the present invention is preferably 15 μm or more and 60 μm or less, more preferably 15 μm or more and 50 μm or less, most preferably 20 μm or more and 45 μm or less. With a volume average particle diameter of a ferrite carrier core material of less than 15 μm, undesirable carrier beads carry over easily occurs. With a volume average particle diameter of a ferrite carrier core material of more than 60 μm, undesirable deterioration of image quality easily occurs.

The volume average particle diameter of a ferrite carrier core material can be examined by a laser diffraction and scattering method. For example, the examination can be performed by using a Microtrac particle size analyzer manufactured by Nikkiso Co., Ltd., (Model 9320-X100) with a refractive index of 2.42, under an environment at 25±5° C. and a humidity of 55±15%. The volume average particle diameter (median diameter) referred to here is a particle diameter at which the cumulative percentage of undersize particles based on volume distribution mode is 50%. Water can be used as the dispersion medium.

1-4. Saturation Magnetization

Preferably, the saturation magnetization of the ferrite carrier core material of the present invention is 30 $Am^2$/kg or more and 80 $Am^2$/kg or less. The saturation magnetization referred to here is a magnetization of a ferrite carrier core material under a magnetic field of 3K·1000/4π·A/m. With a saturation magnetization of a ferrite carrier core material of less than 30 $Am^2$/kg at 3K·1000/4π·A/m, the magnetization of scattering objects is worsened, resulting in image defects due to carrier beads carry over. Meanwhile, with a saturation magnetization of a ferrite carrier core material of more than 80 $Am^2$/kg at 3K·1000/4π·A/m, a magnetic brush is excessively hardened, resulting in a worsened image quality.

The saturation magnetization can be examined, for example, by the following method. The examination is performed by using an integral-type B—H tracer BHU-60 (manufactured by Riken Denshi Co., Ltd.). Between electromagnets, an H coil for examining magnetic field and a 4λI coil for examining magnetization are placed. In this case, a sample (resin-filled ferrite carrier) is placed in the 4πI coil. The current in the electromagnet is changed to and the outputs of the H coil and the 4πI coil under changed magnetic field H are integrated, respectively. A hysteresis loop is drawn on a recording paper with the H output shown along the X-axis and the output of the 4πI coil shown along the Y-axis. The examination is performed under conditions with a filling amount of sample of about 1 g, a cell to be filled with sample having an inner diameter of 7 mmφ±0.02 mm and a height of 10 mm±0.1 mm, and a 4πI coil having 30 turns.

1-5. Electrical Resistivity

The electrical resistivity of the ferrite carrier core material of the present invention examined under normal temperature and humidity is preferably $5 \times 10^7 \Omega$ to $2.5 \times 10^9 \Omega$, more preferably $7.5 \times 10^7 \Omega$ to $1.0 \times 10^9 \Omega$, most preferably $1.0 \times 10^8 \Omega$ to $7.5 \times 10^8 \Omega$.

With an electrical resistivity of a ferrite carrier core material of less than $5 \times 10^7 \Omega$ under normal temperature and humidity, leakage of electrical charge occurs to cause undesirable white spots in an image and carrier scattering. With an electrical resistivity of more than $2.5 \times 10^9 \Omega$, when mixed with a toner, the ferrite carrier core material requires a longer time for the charge amount to reach a saturation value, easily causing toner scattering immediately after refilling of the toner, which is undesirable.

The electrical resistivity of a ferrite carrier core material can be examined, for example, by the following method. First, non-magnetic parallel plate electrodes (10 mm×40 mm) are opposed to each other at a distance between the electrodes of 6.5 mm. The space between the electrodes is filled with weighed 200 mg of a sample. A magnet (surface magnetic flux density: 1500 Gauss, area of magnet in contact with electrode: 10 mm×30 mm) is fixed to the parallel plate electrodes so as to hold the sample between the electrodes. The electrical resistivity is examined by applying a voltage of 1000 V, using an insulation resistivity tester (SM-8210 manufactured by DKK-Toa Corporation). The term "under normal temperature and humidity" referred to here means under an environment at a room temperature of 20° C. to 25° C. and a humidity of 50% to 60%. The electrical resistivity is examined after the sample is exposed in a constant temperature and humidity chamber at the controlled room temperature and humidity for 12 hours or more.

2. Ferrite Carrier for Electrophotographic Developer of the Present Invention The ferrite carrier for an electrophotographic developer of the present invention (hereinafter referred to as "ferrite carrier") includes the ferrite carrier core material and a resin coating layer provided on the surface of the ferrite carrier core material. The resin coating layer may be made of one layer or a plurality of layers. The number of layers of the resin coating layer can be determined corresponding to the desired properties. In the case of providing two or more resin coating layers, the composition of, the resin coating amount of, and the apparatus for use in forming each resin coating layer may be changed or may not be changed.

In the ferrite carrier of the present invention, preferably the resin coating amount is 0.1 mass % or more and 10 mass % or less relative to the ferrite carrier core material. With a resin coating amount of less than 0.1 mass %, it is difficult to form a uniform resin coating layer on the carrier surface. Meanwhile, with a resin coating amount of more than 10 mass %, aggregation of the ferrite carrier occurs, resulting in the decrease in productivity such as decrease in yield and the fluctuations in properties of a developer such as fluidity and charge amount in a real machine.

The resin to constitute a resin coating layer may be appropriately selected depending on the toner to be used in combination, the environment to be employed, and the like. The type thereof is not specifically limited, and examples thereof include a fluorine-contained resin, an acrylic resin, an epoxy resin, a polyamide resin, a polyamide-imide resin, a polyester resin, an unsaturated polyester resin, a urea resin, a melamine resin, an alkyd resin, a phenol resin, a fluorine-contained acrylic resin, an acrylic-styrene resin and a silicone resin, or a modified silicone resin which is modified with each of the resins such as an acrylic resin, a polyester resin, an epoxy resin, a polyamide resin, a polyamide-imide resin, an alkyd resin, a urethane resin and a fluorine-contained resin. In the present invention, an acrylic resin, a silicone resin, or a modified silicone resin is most preferred for use.

Also, in order to control the electrical resistivity, the charge amount and the charging rate of the ferrite carrier of the present invention, a conducting agent may be contained in the resin coating layer. Since a conducting agent itself has a low electrical resistivity, an excessively high content easily causes a rapid leakage of charge. The content is therefore 0.25 mass % to 20.0 mass %, preferably 0.5 mass % to 15.0 mass %, particularly preferably 1.0 mass % to 10.0 mass %, relative to the solid content of the resin. Examples of the conducting agent include a conducting carbon, an oxide such as titanium oxide and tin oxide, and various organic conducting agents.

Also, a charge control agent may be contained in the resin coating layer. Examples of the charge control agent include various charge control agents for general use in toner, various silane coupling agents, and inorganic minute particles. The reason for use is that in controlling the surface coating area of a resin to make a relatively small exposure area of a core material, the charging capability is reduced in some cases, and the addition of various charge control agents and a silane coupling agent can control the reduction. The types of the charge control agent and the coupling agent are not particularly limited, and a charge control agent such as a nigrosine dye, a quaternary ammonium salt, an organometallic complex, and a metal-containing monoazo dye, an aminosilane coupling agent, and a fluorine-contained silane coupling agent are preferred.

3. Method for Manufacturing Ferrite Carrier Core Material and Ferrite Carrier

The method for manufacturing the ferrite carrier core material and the ferrite carrier of the present invention is described as follows.

The method for manufacturing the ferrite carrier core material of the present invention includes the steps of obtaining a ferrite particle precursor containing 15 mass % or more and 25 mass % or less of Mn, 0.5 mass % or more and 5.0 mass % or less of Mg, 0.05 mass % or more and 4.0 mass % or less of Sr, and 45 mass % or more and 55 mass % or less of Fe, sticking $SiO_2$ to the surface of the ferrite particle precursor, and sintering the ferrite particle precursor with a surface stuck to $SiO_2$. According to the manufacturing method, the ferrite carrier core material described above can be obtained.

(1) Step of Manufacturing Ferrite Particle Precursor

The step of manufacturing a ferrite particle precursor may be performed, for example, by the following method. First, after an appropriate amount of raw materials are weighed, the materials are pulverized and mixed by a ball mill, a vibration mill or the like for 0.5 hours or more, preferably for 1 hour or more and 20 hours or less. The raw materials are selected such that the elements described above are contained in the range in a composition, though not specifically limited.

The pulverized product thus obtained is pelletized using a pressure molding machine or the like and calcined at a temperature of 700° C. or higher and 1200° C. or lower. Alternatively, without using a pressure molding machine, a slurry made from the pulverized product with addition of water may be granulated to particles using a spray dryer so as to be calcined. The calcined product is further pulverized by a ball mill, a vibration mill or the like, and then formed into a slurry with addition of water and, if required, a dispersant, a binder or the like. After viscosity adjustment, the slurry is granulated into particles by a spray dryer. In the pulverization after calcination, water may be added to the calcined product to be pulverized by a wet ball mill, a wet vibration mill or the like.

Although the pulverizing machine such as a ball mill and a vibration mill is not specifically limited, preferably granular beads having a particle diameter of 1 mm or less are employed as the media for use in order to achieve effective and uniform dispersion of raw materials. Also, by adjustment of the diameter of beads for use, the composition and the pulverization time, the degree of pulverization can be controlled.

Subsequently, the granulated product thus obtained is heated at 400° C. or higher and 1000° C. or lower for removal of organic components such as an added dispersant and a binder (binder removing step), so that a ferrite particle precursor can be obtained. In the case of sintering with a dispersant and a binder remaining, the oxygen concentration in a sintering apparatus easily fluctuates due to decomposition and oxidization of the organic components, which greatly affects the magnetic properties, causing difficulty in stable manufacturing. As described above, a ferrite particle precursor can be obtained.

(2) Step of Coating with $SiO_2$

Subsequently, the surface of the ferrite particle precursor obtained in the step described above is coated with $SiO_2$. On this occasion, for example, $SiO_2$ particles are stuck on the surface of the ferrite particle precursor. The $SiO_2$ particles are not specifically limited, and amorphous silica synthesized by a combustion method, a precipitation method, or the like is suitably used.

In the present embodiment, the $SiO_2$ coating is applied to the particle after the binder removing step, and without limitation thereto, the $SiO_2$ coating may be applied to the particle granulated by a spray dryer before the binder removing step.

The method for coating the surface of a ferrite particle precursor with $SiO_2$ is not specifically limited. For example, the method is performed by dry mixing using a mixing mill or the like. Alternatively, a slurry is made from $SiO_2$ particles, and various methods such as a spray drying method with a fluidized bed, a rotary drying method, and an immersion drying method using a versatile mixer may be employed.

(3) Sintering Step

The ferrite particle precursor with the surface coated with $SiO_2$ (raw material of ferrite particle) obtained as described above is maintained at a temperature of 800 to 1500° C. for 1 to 24 hours under an atmosphere with oxygen at a controlled concentration to perform sintering. On this occasion, with use of a rotary electric furnace, a batch-type electric furnace, or a continuous electric furnace, an inert gas such as nitrogen or a reducing gas such as hydrogen and carbon monoxide may be driven into the atmosphere in sintering so as to control the oxygen content.

The sintered product thus obtained is de-agglomerated and classified. As the classification method, a conventional method such as classification by wind force, mesh filtration, and settling may be employed to obtain a desired particle diameter through particle size control.

If required, the surface is heated at low temperature to undergo an oxidation film treatment, so that the electrical resistivity can be controlled. The oxidation film treatment can be achieved, for example, by heat treatment at 300° C. or higher and 700° C. or lower in a generally used rotary electric furnace, batch-type electric furnace, or the like. Preferably the thickness of the oxide film formed by the treatment is 0.1 nm or more and 5 μm or less. With a thickness of less than 0.1 nm, the effect of the oxide film layer is small, and with a thickness of more than 5 μm, desired properties are hardly obtained due to decrease in magnetization and excessively high resistivity, which is undesirable. If required, reduction may be performed before the oxidation film treatment. A ferrite carrier core material having Si localized in the surface of a ferrite particle can be manufactured as described above.

The ferrite carrier of the present invention is made by coating the surface of the ferrite carrier core material with the resin to form a resin coating layer. As the method for forming the resin coating layer, a known method such as brush coating, spray drying with a fluidized bed, rotary drying and immersion drying with a versatile mixer may be employed. In order to improve the resin coating ratio in the surface of a ferrite carrier core material, a method using a fluidized bed is preferred.

Baking after application of a coating resin to a ferrite carrier core material may be performed by any of external heating or internal heating. For example, any of a fixed or fluidized electric furnace, a rotary electric furnace and a burner furnace, or microwaves may be used for the baking. When a UV-curing resin is used, a UV heating unit is used. The baking temperature of a resin needs to be equal to or higher than the melting point or the glass transition point, though different depending on the resin for use. For a heat-curing resin or a condensation cross-linking resin, the baking temperature needs to be raised to a point where sufficient curing is achieved.

4. Electrophotographic Developer of the Present Invention>

The electrophotographic developer of the present invention is described as follows. The electrophotographic developer of the present invention is composed of the ferrite carrier described above and toner. There are two types of toner particles to constitute the electrophotographic developer of the present invention: pulverized toner particles manufactured by a pulverizing method and polymerized toner particles manufactured by a polymerization method. In the present invention, toner particles obtained by any of the methods may be used.

The pulverized toner particles may be obtained, for example, by the successive steps of sufficiently mixing a binder resin, an electric charge control agent and a coloring agent with a mixer such as Henschel mixer, melt-kneading the mixture with a twin-screw extruder, cooling, pulverizing and classifying the extruded product, adding an external additive, and mixing with a mixer.

Examples of the binder resin to constitute pulverized toner particles include polystyrene, chloropolystyrene, a styrene-chlorostyrene copolymer, a styrene-acrylate copolymer, a styrene-methacrylic acid copolymer, a rosin-modified maleic acid resin, an epoxy resin, a polyester resin and a polyurethane resin, though not specifically limited. These may be used alone or may be mixed for use.

Any electric charge control agent may be used. Examples of the agent for positively charged toners include a nigrosine dye and a quaternary ammonium salt. Examples of the agent for negatively charged toners include a metal-containing mono-azo dye.

As the coloring agent (coloring material), conventionally known dyes and pigments may be used. For example, carbon black, phthalocyanine blue, permanent red, chrome yellow, phthalocyanine green and the like may be used. In addition, an external additive such as silica powder and titania may be added to improve the fluidity and the aggregation resistance of the toner, depending on the toner particles.

Polymerized toner particles are manufactured by a known method such as suspension polymerization, emulsion polymerization, emulsion aggregation, ester elongation polymerization and phase inversion emulsion. Such polymerized toner particles are obtained through the following steps. For example, a colored dispersion including a coloring agent dispersed in water using a surfactant is mixed and stirred with a polymerizable monomer, a surfactant and a polymerization initiator in an aqueous medium, such that the polymerizable monomer emulsified and dispersed in the aqueous medium is polymerized while being stirred and mixed. After the polymerization, a salting-out agent is added to salt out polymer particles. The particles obtained by the salting out are subjected to filtration, rinsing and drying, so that polymerized toner particles can be obtained. Subsequently, to the toner particles dried on an as needed basis, an external additive may be added to impart functions.

In manufacturing of the polymerized toner particles, a fixation improver, a charge control agent may be compounded in addition to the polymerizable monomer, the surfactant, the polymerization initiator and the coloring agent, such that the various properties of the polymerized toner particles thereby obtained can be controlled or improved. Furthermore, a chain transfer agent may be used to improve the dispersibility of the polymerizable monomer into an aqueous medium and control the molecular weight of a polymer to be obtained.

Examples of the polymerizable monomer for use in the manufacturing of the polymerized toner particles include styrene and a derivative thereof, ethylene-unsaturated monoolefins such as ethylene and propylene, vinyl halogenides such as vinyl chloride, vinyl esters such as vinyl acetate, and α-methylene aliphatic monocarboxylates such as methyl acrylate, ethyl acrylate, methyl methacrylate, ethyl methacrylate, 2-ethylhexyl methacrylate, dimethylamino acrylate, and diethylamino methacrylate, though not specifically limited.

As the coloring agent (coloring material) for use in preparation of the polymerized toner particles, conventionally known dyes and pigments may be used. For example, carbon black, phthalocyanine blue, permanent red, chrome yellow, phthalocyanine green and the like may be used. In addition, these coloring agents may be subjected to surface modification using a silane coupling agent, a titanium coupling agent or the like.

As the surfactant for use in the manufacturing of the polymerized toner particles, an anionic surfactant, a cationic surfactant, an amphoteric surfactant, or a non-ionic surfactant may be used.

Examples of the anionic surfactant include a fatty acid salt such as sodium oleate and castor oil, an alkyl sulfate such as sodium lauryl sulfate and ammonium lauryl sulfate, an alkyl benzene sulfonate such as sodium dodecyl benzene sulfonate, an alkyl naphthalene sulfonate, an alkyl phosphate, a naphthalene sulfonic acid-formaldehyde condensate, and a polyoxyethylene alkyl sulfate. Examples of the non-ionic surfactant include a polyoxyethylene alkyl ether, a polyoxyethylene fatty acid ester, a sorbitan fatty acid ester, a polyoxyethylene alkyl amine, glycerol, a fatty acid ester, and an oxyehtylene-oxypropylene block polymer. Examples of the cationic surfactant include an alkyl amine salt such as lauryl amine acetate, a quaternary ammonium salt such as lauryl trimethyl ammonium chloride and stearyl trimethyl ammonium chloride. Examples of the amphoteric surfactant include an amino carboxylate and an alkyl amino acid.

The amount of the surfactants described above used may be typically in the range of 0.01 mass % or more and 10 mass % or less relative to the polymerizable monomer. Such a surfactant has an effect on the dispersion stability of a monomer and the environment-dependency of the polymerized polymer obtained. The amount used within the range is preferred from the viewpoints of securing the dispersion stability of the monomer and reducing the environment-dependency of the polymerized toner particles.

In manufacturing of polymerized toner particles, a polymerization initiator is usually used. There are two types of polymerization initiators: a water-soluble polymerization initiator and an oil-soluble polymerization initiator. In the present invention any one of the polymerization initiator can be used. Examples of the water-soluble polymerization initiator capable of using in the present invention include a persulfate such as potassium persulfate and ammonium persulfate, and a water-soluble peroxide compound. Examples of the oil-soluble polymerization initiator include an azo compound such as azo-bis-isobutylonitrile and an oil-soluble peroxide compound.

In the case of using a chain transfer agent in the present invention, examples of the chain transfer agent include mercaptans such as octyl mercaptan, dodecyl mercaptan, and tert-dodecyl mercaptan, and carbon tetrabromide.

In the case of polymerized toner particles for use in the present invention containing a fixation improver, examples of the fixation improver include a natural wax such as carnauba wax and an olefin wax such as polypropylene and polyethylene.

In the case of polymerized toner particles for use in the present invention containing a charge control agent, the charge control agent for use is not specifically limited, and examples thereof include a nigrosine dye, a quaternary ammonium salt, an organic metal complex, and a metal-containing mono-azo dye.

Examples of the external additive for use in improving the fluidity of polymerized toner particles include silica, titanium oxide, barium titanate, fluorine-contained resin fine particles, and acrylic resin fine particles, which may be used alone or in combination.

Furthermore, examples of the salting-out agent for use in separating polymerized particles from an aqueous medium include a metal salt such as magnesium sulfate, aluminum sulfate, barium chloride, magnesium chloride, calcium chloride and sodium chloride.

The toner particles manufactured as described above have a volume average particle diameter in the range of 2 μm or more and 15 μm or less, preferably 3 μm or more and 10 μm or less. The polymerized toner particles have higher uniformity than the pulverized toner particles. With a size of toner particles of less than 2 μm, fogging and toner scattering tend to be caused due to reduction in charging ability. With a size of more than 15 μm, deterioration in the image quality is caused.

The ferrite carrier manufactured as described above and a toner are mixed to obtain an electrophotographic developer. Preferably the mixing ratio between the ferrite carrier and the toner, i.e., toner density, is set at 3 mass % or more and 15 mass % or less. With a toner density of less than 3 mass %, it is difficult to obtain a desired image density, while with a toner density of more than 15 mass %, toner scattering and fogging easily occur.

The electrophotographic developer of the present invention may be used also as a refill developer. On this occasion, preferably the mixing ratio between the ferrite carrier and the toner, i.e., toner density, is set at 100 mass % or more and 3000 mass % or less.

The electrophotographic developer of the present invention prepared as described above can be used in a digital copier, printer, fax, printing machine or the like, with a developing method in which a static latent image formed on a latent image retainer having an organic photoconductor layer is reversal-developed with a magnetic brush of a two-component developer including a toner and a ferrite carrier under a biased electric field. The electrophotographic developer is also applicable to a full-color machine using an alternating electric field with an AC bias superimposed on a DC bias in application of the development bias on the static latent image-side from a magnetic brush.

Although the present invention is described specifically with reference to Examples and the like, the present invention is not limited thereto.

EXAMPLE

Example 1

Raw materials were weighed to obtain a composition comprising 38.7 mol % of MnO, 10.0 mol % of MgO, 50.6 mol % of $Fe_2O_3$, and 0.7 mol % of SrO. The mixture was pulverized by a dry media mill (vibration mill, ⅛-inch diameter stainless steel beads) for 5 hours to obtain a pulverized product, from which about 1-mm square pellets were manufactured using a roller compacter. Trimanganese tetraoxide was used as the raw material of MnO, magnesium hydroxide was used as the raw material of MgO, and strontium carbonate was used as the raw material of SrO, respectively.

Coarse powder was removed from the pellets with a vibrating sieve with an opening of 3 mm, and then fine powder was removed with a vibrating sieve with an opening of 0.5 mm. The pellets were then heated and calcined at 1100° C. for 3 hours by a rotary electric furnace.

Subsequently, the calcined product was pulverized for 6 hours using a dry media mill (vibration mill, ⅛-inch diameter stainless steel beads) so as to obtain a pulverized product having a volume average particle diameter of about 5 μm. Subsequently, water was added to the pulverized product obtained to make a slurry, which was then further pulverized for 6 hours using a wet media mill (horizontal beads mill, zirconia beads with a diameter of 1 mm). As a result of examination of the particle diameter of the slurry (primary particle diameter of the pulverized product) using a Microtrac, $D_{50}$ was about 2 μm. An appropriate amount of dispersant was added to the slurry, and PVA (10% solution) as a binder was added in an amount of 0.4 mass % relative to the solid content. Subsequently, granulation and drying were performed by a spray dryer, and the particles (granulated product) obtained were subjected to particle size control. The granulated product obtained was heated at 800° C. for 2 hours in an air atmosphere using a rotary electric furnace so as to remove organic components such as dispersant and binder (binder removing treatment).

Subsequently, 1.0 mass % of $SiO_2$ particles (BET value: 50 $m^2/g$) of amorphous silica synthesized by a combustion method was added to 100 mass % of the granulated product after the binder removing treatment. The mixture was mixed and stirred by a mixing mill for 30 minutes, so that the $SiO_2$ particles were stuck to the surface of the granulated product. The aggregate of the granulated product with $SiO_2$ particles stuck to the surface was loosened through an 80-mesh vibrating sieve, so that the raw material of a ferrite carrier core material was obtained.

Subsequently, the obtained raw material for a ferrite carrier core material was maintained at a sintering temperature of 1160° C., at an oxygen content of 0.7 vol % for 5 hours in a tunnel electric furnace to perform the sintering. On this occasion, the temperature raising rate was controlled at 150° C./hour and the temperature lowering rate after sintering was controlled at 110° C./hour. Subsequently, the sintered product was further de-agglomerated and classified for the particle size control. By magnetic ore dressing, products having low magnetic force were separated to obtain a ferrite carrier core material. The ferrite particle of the obtained ferrite carrier core material had a surface coated with $SiO_2$, so that Si was localized in the surface. The $SiO_2$ coating amount was equal to the amount of $SiO_2$ particles added to the granulated product after binder removing treatment, i.e., 1.0 mass % relative to 100 mass % of ferrite particles.

Example 2

A ferrite carrier core material was obtained in the same manner as in Example 1, except that the amount of SiO2 particles added to the granulated product after binder removing treatment was set at 0.2 mass %.

Example 3

A ferrite carrier core material was obtained in the same manner as in Example 1, except that the amount of $SiO_2$ particles added to the granulated product after binder removing treatment was set at 2.0 mass %.

Example 4

A ferrite carrier core material was obtained in the same manner as in Example 1, except that the amount of $SiO_2$ particles added to the granulated product after binder removing treatment was set at 5.0 mass %.

Comparative Example 1

The raw material for a ferrite carrier core material was obtained in exactly the same manner as in Example 1, except that the granulated product after binder removing treatment was sieved by an 80-mesh vibration sieve without addition of $SiO_2$ particles and without stirring by a mixing mill. Subsequently, a ferrite carrier core material was obtained in the same manner as in Example 1, except that the obtained raw material for a ferrite carrier core material was used.

Comparative Example 2

A ferrite carrier core material was obtained in the same manner as in Example 1, except that the amount of $SiO_2$ particles added to the granulated product after binder removing treatment was set at 0.1 mass %.

Comparative Example 3

A ferrite carrier core material was obtained in the same manner as in Example 1, except that the pellets were prepared without any raw material of SrO, the amount of $SiO_2$ particles added to the granulated product after binder removing treatment was set at 6.0 mass %, and the sintering temperature was set at 1250° C.

Comparative Example 4

In the present Comparative Example, first, a pulverized product having a volume average particle diameter of about 5 μm was obtained in exactly the same manner as in Example 1. Subsequently, the granulated product after binder removing treatment was obtained in the same manner as in Example 1, except that water was added to the pulverized product obtained and $SiO_2$ particles having a volume average particle diameter of 1.5 μm were added to make a slurry. The amount of $SiO_2$ particles added was 1.0 mass % relative to 100 mass % of the pulverized product. Subsequently, the raw material for a ferrite core material was obtained in exactly the same manner as in Example 1, except that the granulated product after binder removing treatment was sieved by an 80-mesh vibration sieve without addition of $SiO_2$ particles thereto and without stirring by a mixing mill. Subsequently, a ferrite carrier core material was obtained in the same manner as in Example 1, except that the obtained raw material for a ferrite carrier core material was used. In the obtained ferrite carrier core material, Si is present not only in the surface but also in the internal part of the ferrite particles. In other words, Si is present dispersed in the whole of a particle of the ferrite carrier core material.

Example 5

In the present Example, a ferrite carrier was obtained by applying a resin coating to the surface of the ferrite carrier core material obtained in Example 1 as described below. First, a condensation-crosslinked silicone resin mainly composed of T units and D units (weight average molecular weight: about 8000) was mixed with toluene as solvent to obtain a silicone resin solution (resin solution concentration: 20%). Subsequently, to 2.5 parts by mass of the obtained silicone resin solution (solid resin content: 0.5 parts by mass), an aminosilane coupling agent (3-aminopropyltrimethoxysilane) as an amine compound was added at a concentration of 10 mass % relative to the solid resin content, and 100 parts by mass of the ferrite carrier core material obtained in Example 1 was added thereto. Subsequently, the silicone resin solution that contains the aminosilane coupling agent and the ferrite carrier core material was mixed and stirred by a versatile mixer so as to evaporate toluene. As a result, the resin was stuck to the surface of the ferrite carrier core material.

After confirmation of sufficient evaporation of toluene, stirring was continued for further 5 minutes so as to almost entirely remove toluene. Subsequently, the obtained ferrite carrier core material with the resin stuck to the surface was taken out from the stirring machine, placed in a container, and heated at 220° C. in a hot air oven for 2 hours, so that the resin was cured.

After the ferrite carrier core material with a cured resin was cooled down to room temperature, the aggregation of the particles was loosened by a vibration sieve with 200-M opening, and non-magnetic materials were removed by a magnetic ore dressing machine. Subsequently, coarse particles were removed again by a vibration sieve, so that a ferrite carrier having the surface of the ferrite carrier core material coated with a resin (resin coated carrier) was obtained.

Comparative Example 5

In the present Comparative Example, a ferrite carrier having the surface of the ferrite carrier core material coated with a resin (resin coated carrier) was obtained in exactly the same manner as in Example 5, except that the ferrite carrier core material obtained in Comparative Example 1 was used.

The ferrite carrier core materials obtained in Examples 1 to 4 and Comparative Example 1 were subjected to chemical analysis, and the degree of localization of Si, the eluted Cl concentration, the eluted Sr concentration, the saturation magnetization, the charge amount, and the electrical resistivity were examined to evaluate the environmental variation properties of charge amount and electrical resistivity. The results are shown in Table 1. Furthermore, the charge amount and the electrical resistivity of the ferrite carriers obtained in Example 5 and Comparative Example 2 were examined. The results are shown in Table 2. The method for examining the charge amount is as follows. The chemical analysis and the methods for examining the degree of localization of Si, the eluted Cl concentration, the eluted Sr concentration, the saturation magnetization, and the electrical resistivity are as described above. The examination of the electrical resistivity was performed after the ferrite carrier core material or the ferrite carrier was exposed to each of the following environments for 12 hours or more, in the same manner as in the examination of the charge amount.

Charge Amount

The ferrite carrier core materials obtained in Examples 1 to 4 and Comparative Example 1, or the ferrite carriers obtained in Example 5 and Comparative Example 2 (resin coated carriers) were used as samples. A sample in amount of 46.75 g and a commercially available toner with negative polarity used for full-color printers (cyan toner, for use in DocuPrint C3530 manufactured by Fuji Xerox Co., Ltd.) in an amount of 3.25 g were weighed, and the weighed sample and toner were exposed to each of the following environments for 12 hours or more. Subsequently, the sample and toner were placed in a 50-cc glass bottle, and stirred at a rotation speed of 100 rpm for 30 minutes, so that a developer composed of the mixture of the sample and the toner was obtained. The toner density of the developer was 6.5 wt %.

Subsequently, in preparation of the device for examining the charge amount, a magnet roll having magnets (magnetic flux density: 0.1 T) with N poles and S poles in a total of 8 poles alternately arranged on the inner diameter side of a cylindrical element tube of aluminum having a diameter of 31 mm and a length of 76 mm (hereinafter referred to as a sleeve) was arranged, and a cylindrical electrode was arranged on the outer diameter side of the sleeve, with a 5.0-mm gap to the surface of the sleeve. Subsequently, 0.5 g of the developer was uniformly stuck to the surface of the sleeve on the outer diameter side. Then, while the magnet roll was rotated at 100 rpm, with the sleeve fixed, a DC voltage of 2000 V was applied between the electrode and the sleeve for 60 seconds, so that the toner was transferred to the electrode. On this occasion, the electric charge of the transferred toner was examined by an electrometer (manufactured by Keithley Instruments, insulation resistivity meter model: 6517A) connected to the electrode. After a passage of 60 seconds, the applied voltage was cut off and the rotation of the magnet roll was stopped. The electrode was then removed to examine the weight of the toner transferred to the electrode. The charge amount of the ferrite carrier core material or ferrite carrier as sample was calculated from the examined electric charge and the weight of the transferred toner.

The conditions under each environment are as follows. Normal temperature/normal humidity (NN environment) =temperature: 20 to 25° C., relative humidity: 50 to 60%

High temperature/high humidity (HH environment)=temperature: 30 to 35° C., relative humidity: 80 to 85%

Low temperature/low humidity (LL environment)=temperature: 10 to 15° C., relative humidity: 10 to 15%

<Absolute Value of Charge Amount (NN Environment)>

The absolute value of charge amount examined under NN environment (hereinafter referred to as "absolute value of charge amount (NN environment)") was evaluated. The evaluation criteria were classified into four levels, i.e., ⊚: Excellent, ○: Good, Δ: Fair, and X: Poor. Specifically, the evaluation criteria are as follows.

(Criteria for Absolute Value of Charge Amount (NN Environment))

⊚: 60 μC/g<Charge amount value

○: 50 μC/g<Charge amount value≤60 μC/g

Δ: 40 μC/g<Charge amount value≤50 μC/g

X: Charge amount value≤40 μC/g

<Rate of Environmental Variation of Charge Amount>

The rate of environmental variation of charge amount calculated from the following Expression (2) was evaluated. The evaluation criteria were classified into four levels, i.e., ⊚: Excellent, ○: Good, Δ: Fair, and X: Poor. Specifically, the evaluation criteria are as follows.

Rate of environmental variation of charge amount=Charge amount value examined under LL environment/Charge amount value examined under HH environment×100 . . . (2)

(Criteria for Rate of Environmental Variation of Charge Amount)

⊚: Rate of environmental variation of charge amount≤120

○: 120<Rate of environmental variation of charge amount≤150

Δ: 150<Rate of environmental variation of charge amount≤200

X: 200<Rate of environmental variation of charge amount

<Absolute Value of Resistivity (NN Environment)>

Furthermore, the absolute value of examined electrical resistivity under NN environment (hereinafter referred to as "absolute value of resistivity (NN environment)") was evaluated. The evaluation criteria were classified into four levels, i.e., ⊚: Excellent, ○: Good, Δ: Fair, and X: Poor. Specifically, the evaluation criteria are as follows.

(Criteria for Absolute Value of Resistivity (NN Environment))

⊚: $1.0 \times 10^8 \Omega \leq$ Resistivity value$<7.5 \times 10^8 \Omega$

○ $7.5 \times 10^7 \Omega \leq$ Resistivity value$<1.0 \times 10^8 \Omega$ or $7.5 \times 10^8 \Omega \leq$ Resistivity value$<1.0 \times 10^9 \Omega$ Δ: $5.0 \times 10^7 \Omega \leq$ Resistivity value$<7.5 \times 10^7 \Omega$ or $1.0 \times 10^9 \Omega \leq$ Resistivity value$<2.5 \times 10^9 \Omega$ X: Resistivity value$<5.0 \times 10^7 \Omega$ or Resistivity value$\geq 2.5 \times 10^9 \Omega$ <Rate of Environmental Variation of Resistivity>

The rate of environmental variation of resistivity calculated from the following Expression (3) was evaluated. The evaluation criteria were classified into four levels, i.e., ⊚: Excellent, ○: Good, Δ: Fair, and X: Poor. Specifically, the evaluation criteria are as follows.

Rate of environmental variation of resistivity=$\text{Log}_{10}$ (Resistivity value under LL environment)/$\text{Log}_{10}$ (Resistivity value under HH environment)×100 . . . (3)

(Criteria for Rate of Environmental Variation of Resistivity)

⊚: Rate of environmental variation of resistivity 120

○: 120<Rate of environmental variation of resistivity≤130

Δ: 130<Rate of environmental variation of resistivity≤140

X: 140<Rate of environmental variation of resistivity

TABLE 1

| | Manufacturing conditions | | | Properties of ferrite carrier core material | | | | | | | | | |
|---|---|---|---|---|---|---|---|---|---|---|---|---|---|
| | Amount of SiO₂ added (mass %) | Sintering temperature (° C.) | Oxygen content (vol %) | ICP (mass %) | | | | Si (mass %) | Degree of localization of Si | Eluted Cl (ppm) | Eluted Sr (ppm) | Saturation magnetization (Am²/kg) | Volume average particle diameter (μm) |
| | | | | Fe | Mn | Mg | Sr | | | | | | |
| Example 1 | 1.0 | 1160 | 0.7 | 48.6 | 18.7 | 2.0 | 0.49 | 0.47 | 3.5 | 12.0 | 823 | 69 | 36.7 |
| Example 2 | 0.2 | 1160 | 0.7 | 48.6 | 18.7 | 2.0 | 0.49 | 0.12 | 1.2 | 48.0 | 1106 | 70 | 37.7 |
| Example 3 | 2.0 | 1160 | 0.7 | 49.1 | 18.8 | 2.0 | 0.54 | 0.90 | 6.4 | 6.4 | 62 | 69 | 38.7 |
| Example 4 | 5.0 | 1160 | 0.7 | 47.4 | 18.1 | 1.9 | 0.50 | 2.34 | 19.1 | 1.2 | 33 | 69 | 37.9 |
| Comparative Example 1 | 0.0 | 1160 | 0.7 | 47.9 | 18.0 | 1.9 | 0.50 | 0.04 | 0.60 | 67.8 | 1734 | 70 | 36.6 |
| Comparative Example 2 | 0.1 | 1160 | 0.7 | 49.1 | 18.6 | 2.2 | 0.53 | 0.08 | 0.9 | 55.0 | 1303 | 70 | 37.6 |
| Comparative Example 3 | 6.0 | 1250 | 0.7 | 48.8 | 18.5 | 2.2 | <0.01 | 3.10 | 21.1 | 1.1 | <1 | 68 | 39.4 |
| Comparative Example 4 | 1.0 (dispersed in the whole of particle) | 1160 | 0.7 | 49.0 | 18.6 | 2.1 | 0.52 | 0.45 | 1.0 | 52.0 | 1459 | 69 | 38.1 |

| | Properties of ferrite carrier core material | | | | | | | | | | | |
|---|---|---|---|---|---|---|---|---|---|---|---|---|
| | Charge amount (μC/g) | | | Rate of environmental variation of charge amount | Evaluation for charge amount (NN) | Evaluation for rate of environmental variation of charge | Electrical resistivity (Ω) at 1000 V | | | Evaluation for resistivity (NN) | Rate of environmental variation of resistivity | Evaluation for rate of environmental variation of resistivity |
| | NN | LL | HH | | | | NN | LL | HH | | | |
| Example 1 | 61.6 | 62.0 | 52.3 | 118 | ⊚ | ⊚ | 5.6E+08 | 2.1E+09 | 1.4E+08 | ⊚ | 114 | ⊚ |
| Example 2 | 61.0 | 62.3 | 46.0 | 135 | ⊚ | ⊚ | 2.0E+08 | 1.3E+09 | 6.2E+07 | ⊚ | 117 | ⊚ |
| Example 3 | 63.3 | 65.1 | 60.6 | 108 | ⊚ | ⊚ | 6.7E+08 | 2.0E+09 | 1.9E+08 | ⊚ | 112 | ⊚ |
| Example 4 | 62.7 | 63.2 | 61.0 | 104 | ⊚ | ⊚ | 8.8E+08 | 3.2E+09 | 4.3E+08 | ○ | 110 | ⊚ |
| Comparative Example 1 | 59.3 | 64.5 | 29.3 | 220 | ⊚ | X | 2.6E+07 | 9.7E+08 | 1.2E+06 | X | 148 | X |
| Comparative Example 2 | 60.4 | 65.1 | 32.3 | 202 | ⊚ | Δ | 8.6E+07 | 1.1E+09 | 2.1E+06 | ○ | 143 | X |
| Comparative Example 3 | 38.9 | 40.0 | 37.0 | 108 | X | ⊚ | 3.0E+09 | 4.0E+09 | 8.5E+08 | X | 108 | ⊚ |
| Comparative Example 4 | 59.8 | 64.0 | 31.7 | 202 | ⊚ | X | 9.8E+07 | 1.4E+09 | 3.1E+06 | ○ | 141 | X |

TABLE 2

| | | Properties of ferrite carrier | | | | | | | |
|---|---|---|---|---|---|---|---|---|---|
| | Core material | Charge amount (μC/g) | | Rate of environmental variation of charge amount | Evaluation for rate of environmental variation of charge amount | Electrical resistivity (Ω) at 1000 V | | Rate of environmental variation of resistivity | Evaluation for rate of environmental variation of resistivity |
| | | LL | HH | | | LL | HH | | |
| Example 5 | Example 1 | 68.0 | 57.3 | 119 | ⊚ | 6.6E+09 | 4.4E+08 | 114 | ⊚ |
| Comparative Example 5 | Comparative Example 1 | 72.5 | 31.3 | 232 | X | 9.7E+09 | 1.2E+07 | 141 | X |

As shown in Table 1, the ferrite carrier core materials obtained in Examples 1 to 4 had Si localized in the surface of a ferrite particle that contains Fe, Mn, Mg and Sr in a specified range, with a degree of localization of Si in the range of 1.1 to 20.0. The ferrite carrier core materials obtained in Examples 1 to 4 were rated as or "⊚" or "○" in any of the evaluation for the absolute value of charge amount (NN environment), the rate of environmental variation of charge amount, the absolute value of resistivity (NN environment), and the rate of environmental variation of resistivity. The results indicate that the ferrite carrier core materials obtained in Examples 1 to 4 has desired resistivity properties and charging properties and excellent charging stability and resistivity stability due to the small environmental variation of charge amount and resistivity.

On the other hand, in the ferrite carrier core material in Comparative Example 1, substantially no Si was contained due to no addition of SiO₂ particles, so that Si was not localized in the surface of a ferrite particle. It is conceivable that Si was detected even though without addition of SiO₂ particles, because the raw materials included Si as inevitable impurities. In the ferrite carrier core material in Comparative Example 2, only a very small amount of Si was present in the surface of a ferrite particle, so that Si was not substantially localized in the surface of a ferrite particle. In the ferrite carrier core material in Comparative Example 3, although Si was substantially localized in the surface of a ferrite particle, the ferrite particle contained no Sr. In the ferrite carrier core material obtained in Comparative Example 4, Si was present in not only the surface but also in the internal part of the ferrite particles, so that Si was present dispersed in the whole of a ferrite particle, not localized in the surface of a ferrite particle. The ferrite carrier core materials obtained in Comparative Examples 1 to 4 were rated as "Δ" or "X" in at least one of the evaluations for the absolute value of charge amount (NN environment), the rate of environmental variation of charge amount, the absolute value of resistivity (NN environment), and the rate of environmental variation of resistivity. The results indicate that the ferrite carrier core materials obtained in Comparative Examples 1 to 4 have low charging stability and resistivity stability due to the large environmental variation of charge amount and resistivity, or are not able to obtain desired resistivity properties and charging properties even though having excellent charging stability and resistivity stability.

It is therefore apparent that the ferrite carrier core materials obtained in Examples 1 to 4 are equipped with desired resistivity properties and charging properties together with excellent charging stability and resistivity stability, due to Si localized in the surface of a ferrite particle having the composition described above, with a $SiO_2$ coating amount of 0.2 mass % or more and 5.0 mass % or less relative to 100 parts by mass of a ferrite particle. It is also apparent that ferrite carrier core materials are not able to achieve the performance described above in the case where substantially no Si is contained (Comparative Example 1), in the case where Si is not substantially localized in the surface of a ferrite particle (Comparative Example 2), and in the case where Si is present dispersed in the whole of a ferrite particle (Comparative Example 4). Furthermore, it is apparent that the performance described above is not able to be achieved in the case where a ferrite particle itself contains substantially no Sr, even though having the same $SiO_2$ coating amount as in Example 1 (Comparative Example 3).

Also, as shown in Table 2, the ferrite carrier obtained in Example 5 was rated as "⊙" in any of the evaluation for the rate of environmental variation of charge amount and the rate of environmental variation of resistivity. The results indicate that the ferrite carrier obtained in Example 5 has excellent charging stability and resistivity stability due to the small environmental variation of charge amount and resistivity. It is conceivable that since the ferrite carrier in Example 5 is made by applying a resin coating to the ferrite carrier core material in Example 1, the ferrite carrier can be equipped with the excellent performance as with the ferrite carrier core material in Example 1. It is also conceivable that a ferrite carrier obtained by applying a resin coating to a ferrite carrier core material obtained in any of Examples 2 to 4 instead of the ferrite carrier core material obtained in Example 1 has excellent performance as with the ferrite carrier in Example 5.

On the other hand, the ferrite carrier obtained in Comparative Example 5 was rated as "X" in any of the evaluation for the rate of environmental variation of charge amount and the rate of environmental variation of resistivity. The results indicate that the ferrite carrier obtained in Comparative Example 5 has low charging stability and resistivity stability due to the large environmental variation of charge amount and resistivity. It is conceivable that since the ferrite carrier in Comparative Example 5 is made by applying a resin coating to the ferrite carrier core material in Comparative Example 1, the ferrite carrier is not able to be equipped with the excellent performance as with the ferrite carrier core material in Comparative Example 1. It is also conceivable that a ferrite carrier obtained by applying a resin coating to a ferrite carrier core material obtained in any of Comparative Examples 2 to 4 instead of the ferrite carrier core material obtained in Comparative Example 1 is not able to achieve excellent performance as with the ferrite carrier in Comparative Example 5.

Furthermore, a developer can be obtained by applying a resin coating to any of the ferrite carrier core materials obtained in Examples 1 to 4 to make a ferrite carrier represented in Example 5 and by mixing the ferrite carrier with a toner. It is easily guessed that the developer has charging properties and resistivity properties that are stable against fluctuations in environment, so that excellent image quality without image defects such as toner scattering and fogging can be obtained. Also, it is guessed that the developer can be favorably used as a refill developer.

On the contrary, it is easily guessed that the practical use of the resin coated ferrite carriers represented in Comparative Example 5 using the ferrite carrier core material described in any of Comparative Examples 1 to 4 as a developer causes image defects such as toner scattering and fogging due to large fluctuations in charge amount and resistivity resulting from environmental fluctuations.

INDUSTRIAL APPLICABILITY

The ferrite carrier core material for an electrophotographic developer of the present invention has desired resistance properties and charging properties, and excellent charging stability and resistivity stability due to small environmental variation of charge amount and resistivity. The ferrite carrier core material for an electrophotographic developer of the present invention and a ferrite carrier for an electrophotographic developer using the ferrite carrier core material can be widely used in a full-color machine in demand for high definition image quality and a high-speed printer in demand for reliability and durability in maintaining an image.

The invention claimed is:

1. A ferrite carrier core material for an electrophotographic developer, comprising a ferrite particle containing:
   15 mass % or more and 25 mass % or less of Mn,
   0.5 mass % or more and 5.0 mass % or less of Mg,
   0.05 mass % or more and 4.0 mass % or less of Sr,
   45 mass % or more and 55 mass % or less of Fe, with Si localized in the surface thereof, and
   a Cl concentration of 0.1 ppm or more to 50 ppm or less as measured in an elution testing of the ferrite carrier core material, the elution testing being performed by:
   (a) consecutively adding to a 150 ml glass bottle: 50.000 g±0.0002 g of the ferrite carrier core material, 50 ml of a phthalate (pH: 4.01), and 1 ml of an ionic strength conditioner;
   (b) closing the glass bottle and shaking the glass bottle on a paint shaker for 10 minutes to obtain a mixture;
   (c) applying a magnet to the bottom of the glass bottle, and filtering the mixture into a 50 ml vessel made of PP through filter paper No. 5B to obtain a supernatant;

(d) measuring the voltage of the supernatant with a pH meter; and (e) comparing the measured voltage to a calibration curve of voltages measured from pure water and solutions having Cl concentrations of 1 ppm, 10 ppm, 100 ppm, and 1000 ppm to calculate the Cl concentration of the ferrite carrier core material.

2. The ferrite carrier core material for an electrophotographic developer according to claim 1, containing 0.1 mass % or more and 3.0 mass % or less of Si.

3. The ferrite carrier core material for an electrophotographic developer according to claim 1, having a degree of localization of Si represented by the following Expression (1) of 1.1 or more and 20.0 or less:

$$\text{Degree of localization of Si} = \text{Si}(s)/\text{Si}(c) \quad (1)$$

wherein Si(s) represents a Si content (mass %) in a surface part of the cross section of a particle examined by energy dispersive X-ray analysis, and Si(c) represents a Si content (mass %) in a central part of the cross section of the particle examined by energy dispersive X-ray analysis; wherein:

the central part of the cross section of the particle is defined as a region surrounded by square S, square S having: a center C located at a midpoint of a line segment Dx defined by a maximum diameter of the cross section, and a side length that is 35% of the length of the line segment Dx; and the surface part of the cross section is defined as a region surrounded by rectangle $R_1$, rectangle $R_1$ having: a first long side having a midpoint located at a first endpoint of line segment Dx, the first long side being perpendicular to line segment Dx, and having a length that is 35% of the length of the line segment Dx, and a second long side having a midpoint located on line segment Dx at a distance that is 15% of the length of line segment Dx from the first end point of line segment Dx towards center C.

4. The ferrite carrier core material for an electrophotographic developer according to claim 1, wherein the surface of a ferrite particle is coated with $SiO_2$, at a $SiO_2$ coating amount of 0.2 mass % or more and 5.0 mass % or less relative to 100 parts by mass of the ferrite particle.

5. The ferrite carrier core material for an electrophotographic developer according to claim 1, having a Sr concentration of 50 ppm or more and 1300 ppm or less in the elution testing of the ferrite carrier core material, wherein the Sr elution testing is performed by:

(a) adding to a 100 ml glass bottle: 50.000 g±0.0002 g of the ferrite carrier core material, and 50 ml of a pH 4 standard solution for calibration of pH meter according to JIS (Japanese Industrial Standard) Z 8802;

(b) closing the glass bottle and shaking the glass bottle on a paint shaker for 10 minutes to obtain a mixture;

(c) sampling 2 ml of a supernatant from the mixture and diluting with 100 ml of pure water to obtain a diluted solution; and (d) measuring the diluted solution by ICP and multiplying the value obtained by 50 to obtain the amount of eluted Sr.

6. The ferrite carrier core material for an electrophotographic developer according to claim 1, having a volume average particle diameter of 15 μm or more and 60 μm or less.

7. The ferrite carrier core material for an electrophotographic developer according to claim 1, having a saturation magnetization of 30 $Am^2$/kg or more and 80 $Am^2$/kg or less.

8. The ferrite carrier core material for an electrophotographic developer according to claim 1, obtained by coating the surface of a ferrite particle precursor containing 15 mass % or more and 25 mass % or less of Mn, 0.5 mass % or more and 5.0 mass % or less of Mg, 0.05 mass % or more and 4.0 mass % or less of Sr, and 45 mass % or more and 55 mass % or less of Fe with $SiO_2$, and by sintering the ferrite particle precursor with the surface coated with $SiO_2$.

9. A ferrite carrier for an electrophotographic developer, comprising the ferrite carrier core material for an electrophotographic developer according to claim 1, and a resin coating layer provided on the surface of the ferrite carrier core material.

10. An electrophotographic developer comprising the ferrite carrier for an electrophotographic developer according to claim 9 and a toner.

11. A method for manufacturing a ferrite carrier core material for an electrophotographic developer, comprising:

coating the surface of a ferrite particle precursor containing 15 mass % or more and 25 mass % or less of Mn, 0.5 mass % or more and 5.0 mass % or less of Mg, 0.05 mass % or more and 4.0 mass % or less of Sr, and 45 mass % or more and 55 mass % or less of Fe with $SiO_2$, and sintering the ferrite particle precursor with the surface coated with $SiO_2$;

wherein the ferrite carrier core material includes Cl at a concentration of 0.1 ppm or more and 50 ppm or less in an elution testing of the ferrite carrier core material, the elution testing being:

(a) consecutively adding to a 150 ml glass bottle: 50.000 g±0.0002 g of the ferrite carrier core material, 50 ml of a phthalate (pH: 4.01), and 1 ml of an ionic strength conditioner;

(b) closing the glass bottle and shaking the glass bottle on a paint shaker for 10 minutes to obtain a mixture;

(c) applying a magnet to the bottom of the glass bottle, and filtering the mixture into a 50 ml vessel made of PP through filter paper No. 5B to obtain a supernatant;

(d) measuring the voltage of the supernatant with a pH meter; and (e) comparing the measured voltage to a calibration curve of voltages measured from pure water and solutions having Cl concentrations of 1 ppm, 10 ppm, 100 ppm, and 1000 ppm to calculate the Cl concentration of the ferrite carrier core material.

12. The method for manufacturing a ferrite carrier core material for an electrophotographic developer according to claim 11, wherein the surface of the ferrite particle precursor is coated with 0.2 mass % or more and 5.0 mass % or less of $SiO_2$ relative to 100 mass % of the ferrite particle precursor.

* * * * *